United States Patent
Lin

(10) Patent No.: US 10,225,579 B2
(45) Date of Patent: Mar. 5, 2019

(54) VIDEO ENCODING APPARATUS AND VIDEO DECODING APPARATUS AND ENCODING METHOD AND DECODING METHOD THEREOF

(71) Applicant: MStar Semiconductor, Inc., Hsinchu Hsien (TW)

(72) Inventor: He-Yuan Lin, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 637 days.

(21) Appl. No.: 14/863,495

(22) Filed: Sep. 24, 2015

(65) Prior Publication Data
US 2016/0088310 A1  Mar. 24, 2016

(30) Foreign Application Priority Data
Sep. 24, 2014  (CN) .......................... 2014 1 0495725

(51) Int. Cl.
*H04N 19/60* (2014.01)
*H04N 19/593* (2014.01)
*H04N 19/42* (2014.01)

(52) U.S. Cl.
CPC ............ *H04N 19/60* (2014.11); *H04N 19/42* (2014.11); *H04N 19/593* (2014.11)

(58) Field of Classification Search
None
See application file for complete search history.

(56) References Cited

U.S. PATENT DOCUMENTS

2012/0128066 A1* 5/2012 Shibahara ............ H04N 19/122
375/240.03

FOREIGN PATENT DOCUMENTS

TW            201325247 A1    6/2013

* cited by examiner

*Primary Examiner* — James M Anderson, II
(74) *Attorney, Agent, or Firm* — Edell, Shapiro & Finnan, LLC

(57) ABSTRACT

A video encoding apparatus for encoding a plurality of image blocks in a video frame includes an intra-frame prediction module, a transformation module and a quantization module. The intra-frame prediction module performs intra-frame prediction on the image blocks to generate a plurality of residual blocks. The transformation module performs a transformation on a target residual block along a predetermined direction according to a transformation matrix to generate a transformation result. The transformation matrix is a product of an initial transformation matrix and a secondary transformation matrix. The initial transformation matrix corresponds to a one-dimensional initial transform performed along the predetermined direction in a two-dimensional initial transform. The secondary transformation matrix corresponds to a one-dimensional secondary transform performed along the predetermined direction in a two-dimensional secondary transform. The quantization module quantizes the transformation result.

20 Claims, 7 Drawing Sheets

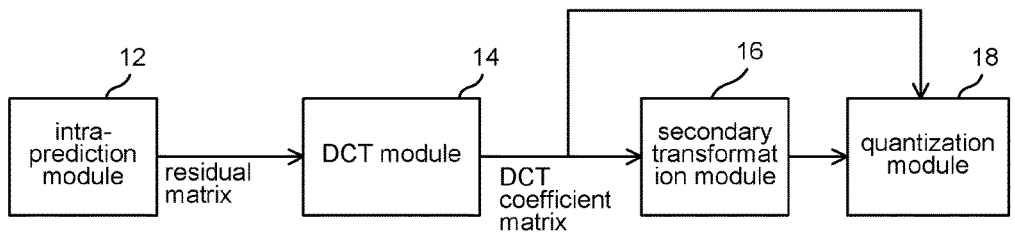
FIG. 1 (prior art)
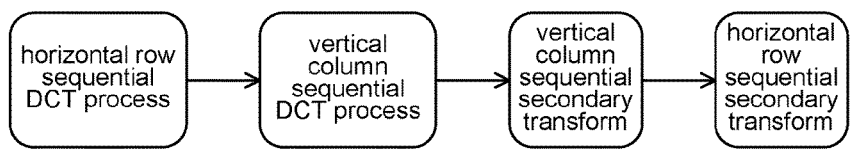
FIG. 2(A) (prior art)
| work cycle | 0 | 1 | 2 | 3 | 4 | 5 | 6 | 7 | 8 | 9 | 10 | 11 | 12 |
|---|---|---|---|---|---|---|---|---|---|---|---|---|---|
| target of DCT process | $R_0$ | $R_1$ | $R_2$ | $R_3$ | $C_0$ | $C_1$ | $C_2$ | $C_3$ | | | | | |
| target of secondary transform | | | | | | $C_0$ | $C_1$ | $C_2$ | $C_3$ | $R_0$ | $R_1$ | $R_2$ | $R_3$ |
FIG. 2(B) (prior art)

| work cycle | 0 | 1 | 2 | 3 | 4 | 5 | 6 | 7 | 8 | 9 |
|---|---|---|---|---|---|---|---|---|---|---|
| target of vertical column sequential initial transform | $C_0$ | $C_1$ | $C_2$ | $C_3$ | | | | | | |
| target of horizontal row sequential combined transform | | | | | $R_0$ | $R_1$ | | | | |
| target of horizontal row sequential initial transform | | | | | $R_2$ | $R_3$ | | | | |
| target of vertical column sequential secondary transform | | | | | | | $C_{0\_R01}$ | $C_{1\_R01}$ | $C_{2\_R01}$ | $C_{3\_R01}$ |

| work cycle | 0 | 1 | 2 | 3 | 4 | 5 | 6 | 7 | 8 | 9 |
|---|---|---|---|---|---|---|---|---|---|---|
| target of initial transform | $R_0$ | $R_1$ | $R_2$ | $R_3$ | | $C_0$ | $C_1$ | $C_2$ | $C_3$ | |
| target of secondary transform | | $R_0$ | $R_1$ | $R_2$ | $R_3$ | | $C_0$ | $C_1$ | $C_2$ | $C_3$ |

| work cycle | 0 | 1 | 2 | 3 | 4 | 5 | 6 | 7 | 8 | 9 |
|---|---|---|---|---|---|---|---|---|---|---|
| target of initial transform | $C_0$ | $C_1$ | $C_2$ | $C_3$ | | $R_0$ | $R_1$ | $R_2$ | $R_3$ | |
| target of secondary transform | | $C_0$ | $C_1$ | $C_2$ | $C_3$ | | $R_0$ | $R_1$ | $R_2$ | $R_3$ |

VIDEO ENCODING APPARATUS AND VIDEO DECODING APPARATUS AND ENCODING METHOD AND DECODING METHOD THEREOF

This application claims the benefit of People's Republic of China application Serial No. 201410495725.2, filed Sep. 24, 2014, the subject matter of which is incorporated herein by reference.

BACKGROUND OF THE INVENTION

Field of the Invention

The invention relates in general to multimedia signal processing technologies, and more particularly to encoding/decoding technologies in video systems.

Description of the Related Art

Digital television broadcasting has matured and become popular with the ever-improving communication technologies. In addition to being transmitted through cables, digital television signals may be propagated in form of wireless signals via base stations or artificial satellites. To satisfy demands on enhanced image quality and reduced transmission data amount, a transmitter end usually encodes and decompresses audio/video signals to be transmitted. Correspondingly, a receiver end needs to correctly decode and decompress the received signals in order to restore the audio/video signals.

FIG. 1 shows a partial functional block diagram of an encoding system compliant to the digital audio video standard (AVS). An intra-prediction module 12 performs an intra-prediction process on image blocks in a video frame to generate luminance residual blocks corresponding to the image blocks. The luminance residual block is provided to a discrete cosine transform (DCT) module 14 for a DCT process to generate a DCT coefficient matrix. To further reduce the data amount, a secondary transformation module 16 performs a secondary transform on low-frequency components in the DCT coefficient matrix. For the AVS encoding system, regardless of the size of the DCT coefficient matrix, the secondary transformation module 16 performs the secondary transform on only 4*4 low-frequency components at the upper left corner. The low-frequency components having undergone the secondary transform and other high-frequency DCT coefficients that have not been processed by the secondary transform are recombined at a quantization module 18, which then performs a quantization process.

In practice, the DCT process the DCT module 14 performs includes a set of DCT performed along the vertical direction and a set of DCT performed along the horizontal direction. Similarly, the secondary transform the secondary transformation module 16 performs is jointly formed by a set of secondary transform performed along the vertical direction and a set of secondary transform performed along the horizontal direction. According to AVS specifications, the DCT module 14 is required to first perform the DCT process on the luminance residual blocks one row after another along the horizontal direction till all the DCT process along the horizontal direction is complete, and then to perform the DCT process one column after another along the vertical direction. Further, according to AVS specifications, the secondary transformation module 16 is required to first perform the secondary transform on the low-frequency components in the DCT coefficient matrix one column after another along the vertical direction till all the secondary transform along the vertical direction is complete, and then to perform the secondary transform one row after another along the horizontal direction. FIG. 2(A) illustrates a sequence relationship of the above transformation processes.

Take an example where the size of a luminance residual block is 4*4. FIG. 2(B) shows a detailed timing relationship between typical DCT process and secondary transform in an AVS encoding system. Symbols $R_0$ to $R_3$ represent four row in a block, and symbols $C_0$ to $C_3$ represent four columns in the block. As shown in FIG. 2(B), in work cycles 0 to 3, the DCT process performed along the horizontal direction is sequentially performed on the rows $R_0$ to $R_3$; in work cycles 4 to 7, the DCT process performed along the vertical direction is sequentially performed on the columns $C_0$ to $C_3$. After the DCT process performed on the column $C_0$ is complete, contents of the column $C_0$ are no longer affected and changed by the DCT process, and so the secondary transformation module 16 may start performing the secondary transform on the column $C_0$ along the vertical direction from the work cycle 5, and so forth. In work cycles 6 to 8, the secondary transform performed along the vertical direction is sequentially performed on the columns $C_1$ to $C_3$; in work cycles 9 to 12, the secondary transform performed along the horizontal direction is sequentially performed on the rows $R_0$ to $R_1$. As seen from FIG. 2(B), a period of 13 work cycles is needed for completing the DCT process and the secondary transform for a 4*4 luminance residual block. In comparison, if the secondary transform is not performed, a period of only 8 work cycles is needed for completing the DCT process for a 4*4 luminance residual block. That is to say, in a typical AVS encoding system, although the secondary transform contributes the benefit of a reduced data amount for encoded results, the encoding process is lengthened and thus overall system performance is degraded.

SUMMARY OF THE INVENTION

To solve the above issues, the present invention provides a video encoding apparatus and video decoding apparatus. By combining the DCT process and secondary transform and incorporating appropriate operation scheduling, the number of work cycles needed for video encoding/decoding can be effectively reduced.

A video encoding apparatus is provided according to an embodiment of the present invention. The video encoding apparatus includes a intra-frame prediction module, a transformation module and an quantization module. The intra-frame prediction module performs intra-frame prediction on the plurality of image blocks to generate a plurality of residual blocks. The transformation module performs a transform on a target residual block along a predetermined direction according to a transformation matrix to generate a transformation result. The transformation matrix is a product of an initial transformation matrix and a secondary transformation matrix. The initial transformation matrix corresponds to a one-dimensional initial transform performed along the predetermined direction in a two-dimensional initial transform. The secondary transformation matrix corresponds to a one-dimensional secondary transform performed along the predetermined direction in a two-dimensional secondary transform. The quantization module quantizes the transformation result.

A video encoding method is provided according to another embodiment of the present invention. The video encoding method includes a transformation step, which performs a transform on a target residual block along a predetermined direction according to a transformation matrix. The transformation matrix is a product of an initial transformation matrix and a secondary transformation matrix. The initial transformation matrix corresponds to a one-dimensional initial transform performed along the predetermined direction in a two-dimensional initial transform. The secondary transformation matrix corresponds to a one-dimensional secondary transform performed along the predetermined direction in a two-dimensional secondary transform.

A video decoding method for decoding a plurality of decoded data is provided according to another embodiment of the present invention. The video decoding method includes: decoding a set of target coded data to generate quantized residual block information; de-quantizing the quantized residual block information to generate intermediate information; performing a reverse transform on the intermediate information along a predetermined direction according to a reverse transformation matrix generate a residual block, wherein the reverse transformation matrix is a product of a reverse initial transformation matrix and a reverse secondary transformation matrix, the reverse initial transformation matrix corresponds to a one-dimensional reverse initial transform performed along the predetermined direction in a two-dimensional reverse initial transform, and the reverse secondary transformation matrix corresponds to a one-dimensional reverse secondary transform performed along the predetermined direction in a two-dimensional reverse secondary transform; performing a intra-frame prediction on the residual block to generate a prediction block; and generating a target image block using the prediction block and the residual block.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 1 is a partial functional block diagram of an encoding system compliant to the digital audio video standard (AVS);

FIG. 2(A) and FIG. 2(B) show a timing relationship of discrete cosine transform (DCT)/secondary transform compliant to digital AVS;

Figure 3:
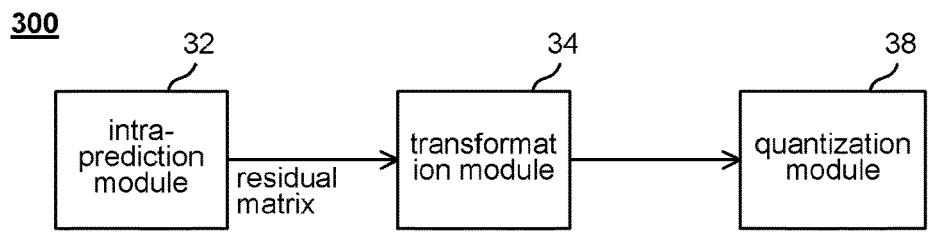
FIG. 3 is a functional block diagram of a video encoding apparatus according to an embodiment of the present invention.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

A video encoding apparatus is provided according to an embodiment of the present invention. In practice, the video encoding apparatus may be integrated in a video encoding system having a secondary transformation mechanism, or may be an independent unit. For illustration purposes, the video encoding apparatus disposed in a digital audio video standard (AVS) encoding system is given as an example, with FIG. 3 showing a partial functional block diagram of the video encoding apparatus.

In the embodiment, an intra-prediction module 32 performs an intra-prediction process on image blocks of a video frame to generate luminance residual blocks corresponding to the image blocks. The transformation module 34 performs an initial transform and a secondary transform on the luminance residual blocks. For example, but not limited to, the initial transform may be a discrete cosine transform (DCT) or an integer transform as a variation of the DCT. As the secondary transform is performed on low-frequency components in the initial transformation result, the size of the secondary transform (the range of the target) is naturally smaller than or equal to the size of the initial transform. FIG. 4(A) to FIG. 4(D) show four possible corresponding relationships between sizes of the secondary transform and the initial transform. In the diagrams, the outer frame represents the size of the initial transform result, and the shaded area represents the range of the target of the secondary transform. Further, in the diagrams, the initial transform result includes $N_1$ columns and $N_2$ rows of elements, and the secondary transform is to be performed on $M_1$ columns and $M_2$ rows of elements therein.

Figure 4A:
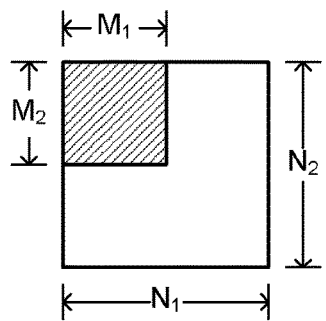
FIG. 4(A) to FIG. 4(D) show four possible corresponding relationships between sizes of a secondary transform and an initial transform.
Figure 4B:
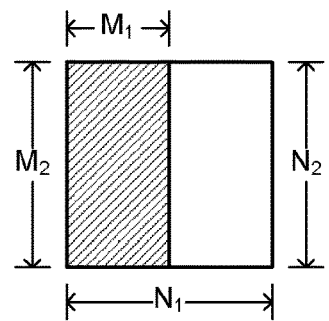
Figure 4D:
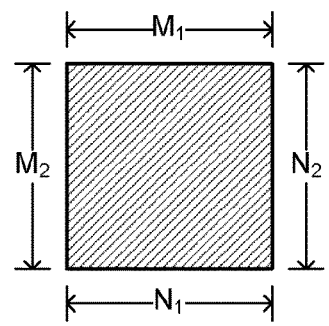
Figures 5A, 5B, 5C:
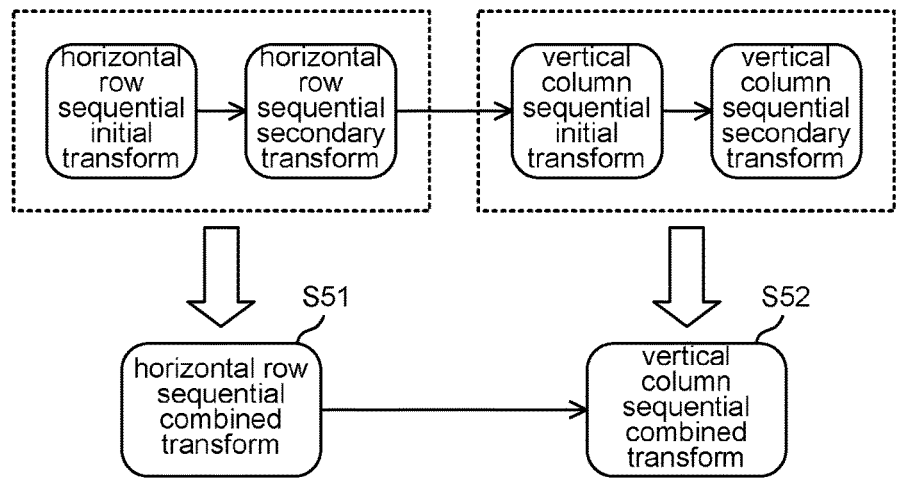
FIG. 5(A) to FIG. 5(C) show an example of an operation procedure of a transformation module according to an embodiment of the present invention.

Operation details of the transformation module 34 under conditions shown in FIG. 4(D), where a two-dimensional initial transform and a two-dimensional secondary transform have the same size ($M_1=N_1$ and $M_2=N_2$), are given below. Since the two-dimensional initial transform and the two-dimensional secondary transform are both linear transforms, changing the sequence of performing these two transforms does not affect an ultimate transformation result. Thus, as shown in FIG. 5(A), the secondary transform horizontally performed one row after another, i.e., the horizontal row sequential secondary transform, can be brought in between the horizontal row sequential initial transform and the vertical column sequential initial transform. Further, if $M_1=N_1$ and $M_2=N_2$, the horizontal row sequential initial transform and the horizontal row sequential secondary transform can be combined into a single transform (step S51), and the vertical column sequential initial transform and the vertical column sequential secondary transform can be combined into a single transform (step S52). More specifically, a transformation matrix corresponding to the horizontal row sequential initial transform multiplied by a transformation matrix corresponding the horizontal row sequential secondary transform is a transformation matrix of the horizontal row sequential combined transform. Similarly, a transformation matrix corresponding to the vertical column sequential initial transform multiplied by a transformation matrix corresponding to the vertical column sequential secondary transform is a transformation matrix of the vertical column sequential combined transform. FIG. 5(B) shows an example of a detailed operation timing of the transformation module 34 under conditions where $M_1=N_1=M_2=N_2=4$. In work cycles 0 to 3, the combined transform performed along the horizontal direction is sequentially performed on rows $R_0$ to $R_3$; in work cycles 4 to 7, the combined transform performed along the vertical direction is sequentially performed on columns $C_0$ to $C_3$. It is seen from FIG. 5(B) that, the transformation module 34 only needs a period of 8 work cycles to complete the two-dimensional initial transform and the two-dimensional secondary transform, and is apparently more efficient than a conventional solution. An output signal of the transformation module 34 is then provided to a quantization module 36 for a quantization process.

In a digital AVS encoding system, when $M_1=N_1=M_2=N_2=4$, the combined transformation matrix is:

$$\begin{bmatrix} 34 & 77 & 79 & 55 \\ 58 & 69 & -33 & -84 \\ 72 & -7 & -75 & 73 \\ 81 & -75 & 58 & -28 \end{bmatrix}$$

In practice, the intra-prediction module 32 may be a combination of arithmetic logic units (ALU) or other circuits. One example of the intra-prediction module includes a multiplexer that receives multiple pixels as inputs, adders at the output of the multiplexer, delay units, rounding and shifting units and other possible combination of ALUs. The transformation matrix 34 may be implemented as including fixed and/or programmable digital logic circuits, e.g., programmable logic gate arrays, application-specific integrated circuits, microcontrollers, microprocessors, digital signal processors and other necessary circuits. For instance, the transformation module may be a combination of adders and multipliers, where the multipliers may have variable coefficients (programmable) or constant coefficients. In addition, the quantization module 36 may be implemented by multipliers and/or divider units/circuits. Also, it is noted that while the term "luminance residual block" is used throughout the description, other types of residual block, e.g., chrominance residual block, may be used in the present application. It should be noted that, technologies that perform a transform on image data blocks according to a known predetermined transformation matrix are generally known to one person skilled in the art, and shall be omitted herein.

FIG. 5(C) shows another example of an operation timing of the transformation module 34. In the example, the transformation module 34 only combines the horizontal row sequential initial transform and the horizontal row sequential secondary transform, and individually performs the vertical column sequential initial transform and the vertical column sequential secondary transform after completing the combined transform performed along the horizontal direction. When such operation timing is adopted, the transformation module 34 needs a period of only 9 work cycles to complete the two-dimensional initial transform and the two-dimensional secondary transform, and is also more efficient compared to a conventional solution.

In certain circumstances, when it is determined that a target image data block does not require the one-dimensional secondary transform performed along the horizontal direction, the transformation matrix corresponding to the horizontal row sequential secondary transform may be set to a unit matrix, such that the transformation matrix after the horizontal row sequential combined transform is directly equal to the transformation matrix of the horizontal row sequential initial transform. Similarly, when it is determined that a target image data block does not require the one-dimensional secondary transform performed along the vertical direction, the transformation matrix corresponding to the vertical column sequential secondary transform may be set to a unit matrix, such that the transformation matrix of the vertical column sequential combined transform is directly equal to the transformation matrix of the vertical column sequential combined transform.

Figure 4C:
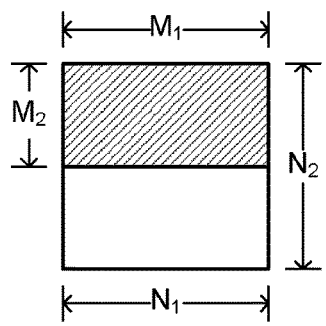
Figures 6A, 6B:
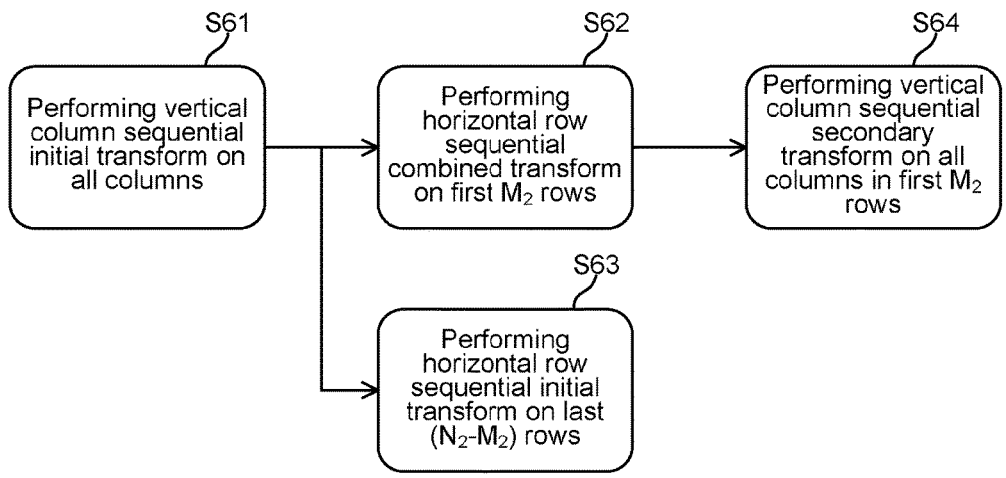
FIG. 6(A) and FIG. 6(B) show an example of an operation procedure of a transformation module according to another embodiment of the present invention.

Detailed operations of the transformation module 34 under conditions where the two-dimensional initial transform and the two-dimensional secondary transform are differently sized ($M_1=N_1$, $M_2<N_2$) as shown in FIG. 4(C) are given below. As shown in FIG. 6(A), in step S61, the transformation module 34 performs a one-dimensional initial transform along the vertical direction on all data of an input image data block one column after another ($1^{st}$ column to $M^{th}$ column). The initial transformation result generated may be regarded as including two sub-blocks. The first sub-block is the first $M_2$ rows in the initial transformation result, and the second sub-block is the last ($N_2-M_2$) rows in the initial transformation result. The first sub-block is a region on which the secondary transform is to be performed, and the second sub-block is not. The transformation module 34 may perform a horizontal row sequential combined transform on the first sub-block according to a combined transformation matrix (step S62), and at the same time perform a horizontal row sequential one-dimensional initial transform on the second sub-block (step S63). At this point, the horizontal and vertical initial transforms of the second sub-block are complete. In step S64, the transformation module 34 only needs to perform a vertical column sequential one-dimensional secondary transform on an intermediate transformation result generated in step S62. FIG. 6(B) shows an example of a detailed operation timing of the transformation module 34 under conditions where $M_1=N_1=N_2=4$ and $M_2=2$. In work cycles 0 to 3, a one-dimensional initial transformation performed along the vertical direction is sequentially performed on columns $C_0$ to $C_3$. In work cycles 4 to 5, a horizontal row sequential combined transform is sequentially performed on rows $R_0$ and $R_1$, and a horizontal row sequential initial transform is performed on rows $R_2$ and $R_3$. In work cycles 6 to 9, a vertical column sequential secondary transform is sequentially performed on the first two rows of data in the columns $C_0$ to $C_3$.

Figures 7A, 7B:
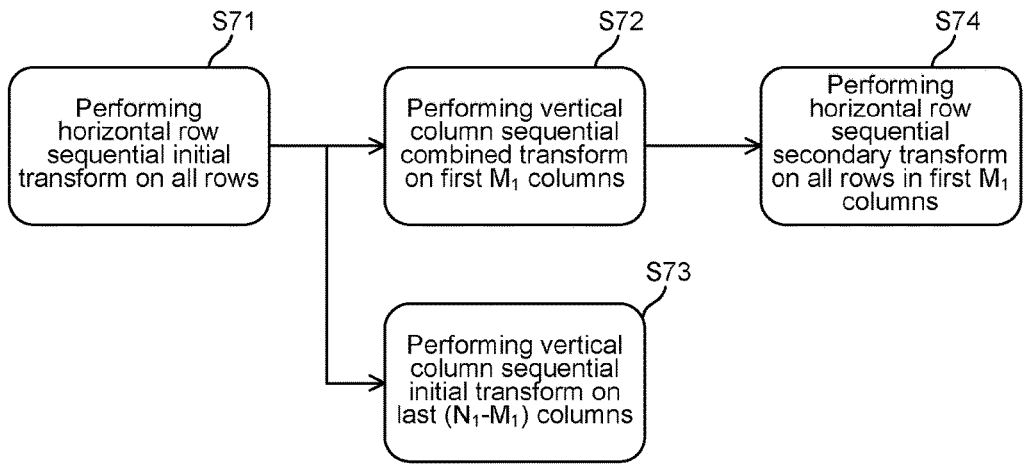
FIG. 7(A) and FIG. 7(B) show an example of an operation procedure of a transformation module according to another embodiment of the present invention.

FIG. 7(A) shows an example of an operation timing of the transformation module 34 under conditions where the two-dimensional initial transform and the two-dimensional secondary transform are differently sized ($M_1<N_1$, $M_2=N_2$) as shown in FIG. 4(C). In step S71, the transformation module 34 first performs a one-dimensional initial transform performed along the horizontal direction one row after another ($1^{st}$ row to $M2^{th}$ row) on all data in an input image data block. An initial transformation result generated in this step may be regarded as including two sub-blocks. The first sub-blocks is the first $M_1$ rows in the initial transformation result, and the second sub-block is the last ($N_1-M_1$) columns in the initial transformation result. The first sub-block is a region on which the secondary transform is to be performed, and the second sub-block is not. The transformation module 34 may perform a vertical column sequential transformation on the first sub-block according to a combined transformation matrix (step S72), and at the same time perform a vertical column sequential initial transform on the second sub-block (step S73). At this point, the horizontal and vertical initial transforms of the second sub-block are complete. In step S74, the transformation module 34 only needs to perform a horizontal row sequential one-dimensional secondary transform on an intermediate transformation result generated in step S72. FIG. 6(B) shows an example of a detailed operation timing of the transformation module 34 under conditions where $M_1=N_1=N_2=4$ and $M_2=2$. In work cycles 0 to 3, a one-dimensional initial transformation performed along the horizontal direction is sequentially performed on rows $R_0$ to $R_3$. In work cycles 4 to 5, a vertical column sequential combined transform is sequentially performed on columns $C_0$ and $C_1$, and a vertical column sequential initial transform is performed on columns $C_2$ and $C_3$. In work cycles 6 to 9, a horizontal row sequential secondary transform is sequentially performed on the first two columns of data in the rows $R_0$ to $R_3$.

When the sizes of the two-dimensional secondary transforms along the horizontal and vertical directions are both smaller than that of the two-dimensional initial transform (i.e., as the conditions where $M_1<N_1$ and $M_2<N_2$ shown in FIG. 4(A)), compared to the number of work cycles the initial transform needs, the number of work cycles the secondary transform needs is smaller, and so the overall efficiency is not noticeably affected. The transformation module 34 may operate according to the process shown in FIG. 2(A) instead of performing the combined transform.

If the sizes of the two-dimensional initial transform and the two-dimensional secondary transform in a video encoding system operating with the transformation module 34 are constant, the transformation module 34 may be designed to fixedly adopt one of the operation procedures in FIG. 5(A), FIG. 6(A) and FIG. 7(A). In contrast, in a video encoding system where the sizes of the two-dimensional initial transform and the two-dimensional secondary transform may dynamically vary, the transformation module 34 may be designed to select its operation procedure according to actual conditions.

A video encoding method is provided according to another embodiment of the present invention. The video encoding method includes a transformation step, which includes: performing a combined transform on a target image data block along a predetermined direction according to a transformation matrix. The transformation matrix is a product of an initial transformation matrix and a secondary transformation matrix.

The initial transformation matrix corresponds to a one-dimensional initial transform performed along the predetermined direction in a two-dimensional initial transform. The secondary transformation matrix corresponds to a one-dimensional secondary transform performed along the predetermined direction in a two-dimensional secondary transform. Variations and modifications given in the description associated with the video encoding apparatus 300 (e.g., further performing a combined transform perpendicular to the predetermined direction) are applicable to the video encoding method, and such repeated details are omitted herein.

The concept of the present invention is applicable to various video encoding systems having a secondary transformation mechanism as well as video decoding systems having a reverse secondary transformation mechanism. More specifically, a two-dimensional reverse initial transform includes a set of reverse initial transform performed along the vertical direction and a set of reverse initial transform performed along the horizontal direction. Similarly, a two-dimensional reverse secondary transform is formed by a set of reverse secondary transform performed along the vertical direction and a set of reverse secondary transform performed along the horizontal direction. When the two-dimensional reverse initial transform and the two-dimensional reverse secondary transform are both linear transforms, changing the sequence of performing these transforms does not affect an ultimate transformation result. Therefore, the one-dimensional reverse initial transform and the one-dimensional reverse secondary transform in the same direction may be selectively combined to enhance the encoding efficiency.

A video decoding apparatus is provided according to another embodiment of the present invention. The video decoding apparatus mainly includes a reverse transformation module. The reverse transformation module performs a reverse transform along a predetermined direction according to a reverse transformation matrix. The reverse transformation matrix is a product of a reverse initial transformation matrix and a reverse secondary transformation matrix. The inverse initial transformation matrix corresponds to a one-dimensional reverse initial transform performed along the predetermined direction in a two-dimensional reverse initial transform. The reverse secondary transformation matrix corresponds to a one-dimensional reverse secondary transform performed along the predetermined direction in a two-dimensional reverse secondary transform. Variations and modifications given in the description associated with the video encoding apparatus 300 (e.g., further performing a combined reverse transform perpendicular to the predetermined direction) are applicable to the video decoding apparatus, and such repeated details are omitted herein. It should be noted that, even when an encoding end does not employ the combined transform according to the present invention, a decoding end may still adopt the combined reverse transform according to the present invention.

In an AVS decoding system, when the sizes of the two-dimensional reverse initial transform and the two-dimensional reverse secondary transform are both 4*4, the combined reverse transformation matrix is:

$$\begin{bmatrix} 34 & 58 & 72 & 81 \\ 77 & 69 & -7 & -75 \\ 79 & -33 & -75 & 58 \\ 55 & -84 & 73 & -28 \end{bmatrix}$$

A video decoding method is provided according to another embodiment of the present invention. The video decoding method includes decoding a set of target coded data to generate quantized residual block information, de-quantizing the quantized residual block information to generate an intermediate information, and then performing a reverse transformation step, which includes: performing a reverse transform on the intermediate information along a predetermined direction according to a reverse transformation matrix to generate a residual block. The reverse transformation matrix is a product of a reverse initial transformation matrix and a reverse secondary transformation matrix. The reverse initial transformation matrix corresponds to a one-dimensional reverse initial transform performed along the predetermined direction in a two-dimensional reverse initial transform. The reverse secondary transformation matrix corresponds to a one-dimensional reverse secondary transform performed along the predetermined direction in a two-dimensional reverse secondary transform. After the reverse transformation step, the method continues to perform an intra-prediction on the residual block to generate a prediction block, and then generates a target image block using the prediction block and the residual block.

Figures 8A, 8B:
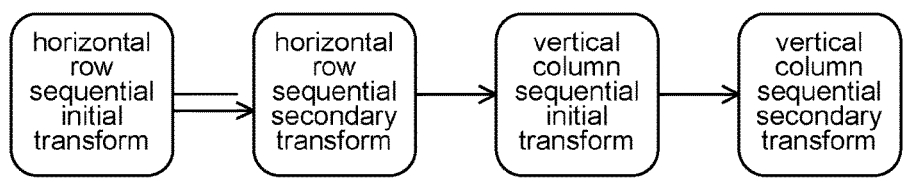
FIG. 8(A) and FIG. 8(B) show an example of an operation procedure of a transformation module according to another embodiment of the present invention.

A video encoding apparatus is provided according to yet another embodiment of the present invention. The video encoding apparatus includes a transformation module, which performs an initial transform and a secondary transform on a image data block. In the embodiment, the transformation module appropriate schedules a sequence for performing a one-dimensional initial transform and a one-dimensional secondary transform in the same direction to achieve enhanced decoding efficiency. As shown in FIG. 8(A), the transformation module brings forward a horizontal row sequential secondary transform to between a horizontal row sequential initial transform and a vertical column sequential initial transform. It should be noted that, after completing the horizontal initial transform for the $1^{st}$ row, the transformation module immediately starts to perform a horizontal secondary transform one row after another. After completing all the horizontal secondary transform, the transformation module performs vertical initial transform one column after another. After completing the vertical initial transform for the $1^{st}$ column, the transformation module immediately starts to perform a vertical secondary transform one column after another. In an example where the sizes of a two-dimensional initial transform and a two-dimensional secondary transform are both 4*4, FIG. 8(B) shows a detail operation timing of the transformation module. In work cycles 0 to 3, the initial transform performed along the horizontal direction is sequentially performed on rows $R_0$ to $R_3$. In work cycles 1 to 4, the secondary transform performed along the horizontal direction is sequentially performed on rows $R_0$ to $R_3$. In work cycles 5 to 8, the initial transform performed along the vertical direction is sequentially performed on columns $C_0$ to $C_3$. In work cycles 6 to 9, the secondary transform performed along the vertical direction is sequentially performed on the columns $C_0$ to $C_3$. It is seen from FIG. 8(B) that, the time needed to complete the initial transform and the secondary transform for one 4*4 image data block is only 10 work cycles.

Figures 9A, 9B:
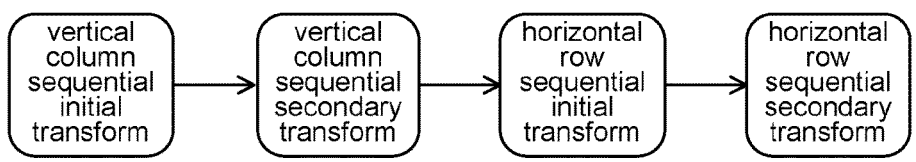
FIG. 9(A) and FIG. 9(B) show an example of an operation procedure of a transformation module according to another embodiment of the present invention.

In an example where the sizes of a two-dimensional initial transform and a two-dimensional secondary transform are both 4*4, FIG. 9(A) and FIG. 9(B) show another detailed operation timing of the transformation module according to the present invention. In the example, the transformation module brings forward the vertical column sequential initial transform and the vertical column sequential secondary transform to before the horizontal row sequential initial transform and the horizontal row sequential secondary transform. As shown in FIG. 9(B), in work cycles 0 to 3, the initial transform performed along the vertical direction is sequentially performed on columns $C_0$ to $C_3$. In work cycles 1 to 4, the secondary transform performed along the vertical direction is sequentially performed on the columns $C_0$ to $C_3$. In work cycles 5 to 8, the initial transform performed along the horizontal direction is sequentially performed on rows $R_0$ to $R_3$. In work cycles 6 to 9, the secondary transform performed along the horizontal direction is sequentially performed on the rows $R_0$ to $R_3$. It is seen from FIG. 9(B) that, the time needed for completing the initial transform and the secondary transform for one 4*4 image data block is only 10 work cycles.

A video encoding method is provided according to another embodiment of the present invention. The video encoding method includes performing following steps on an image data block: a) performing a horizontal initial transform one row after another; b) after completing the horizontal initial transform for the $1^{st}$ row, immediately starting to perform a horizontal secondary transform; c) performing a vertical initial transform one column after another; and d) after completing the vertical initial transform for the $1^{st}$ column, immediately starting to perform a vertical secondary transform one column after another. Step (c) is arranged and performed after completing step (b), or step (a) is arranged and performed after completing step (d).

The above approach for scheduling initial/second transforms is also applicable to a video decoding system having a reverse secondary transformation mechanism. A video decoding apparatus is provided according to another embodiment of the present invention. The video decoding apparatus includes a reverse transformation module. The reverse transformation module performs a horizontal reverse initial transform one row after another, and immediately starts to perform a horizontal reverse secondary transform one row after another after completing the horizontal reverse initial transform for the $1^{st}$ row. The reverse transformation module further performs a vertical reverse initial transform one column after another, and immediately starts to perform a vertical reverse secondary transform one column after another after completing the vertical initial transform for the $1^{st}$ column. It should be noted that, the reverse transformation module performs the vertical reverse initial transform after completing all the horizontal reverse secondary transform, or performs the horizontal reverse initial transform after completing all the vertical reverse secondary transform.

A video decoding method is provided according to another embodiment of the present invention. The video decoding method includes performing following steps: a) performing a horizontal reverse secondary transform one row after another; b) immediately starting to perform a horizontal reverse secondary transform one row after another after completing the horizontal reverse initial transform for the $1^{st}$ row; c) performing a vertical reverse initial transform one column after another; and d) immediately starting to perform a vertical reverse secondary transform one column after another after completing the vertical reverse initial transform for the $1^{st}$ column. Step (c) is arranged and performed after completing step (b), or step (a) is arranged and performed after completing step (d).

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video encoding apparatus, for encoding a plurality of image blocks in a video frame, the video encoding apparatus comprising:
an intra-frame prediction module, configured to perform intra-frame prediction on the plurality of image blocks to generate a plurality of residual blocks;
a transformation module, configured to perform a transform on a target residual block along a predetermined direction according to a transformation matrix to generate a transformation result, wherein the transformation matrix is based on arranging a horizontal row secondary transform between a horizontal row initial transform and a vertical column initial transform;

wherein, the transformation matrix is a product of an initial transformation matrix and a secondary transformation matrix, the initial transformation matrix corresponds to a one-dimensional initial transform performed along the predetermined direction in a two-dimensional initial transform, and the secondary transformation matrix corresponds to a one-dimensional secondary transform performed along the predetermined direction in a two-dimensional secondary transform, wherein the one-dimensional initial transform is a discrete cosine transform performed along the predetermined direction in the two-dimensional initial transform, and the one-dimensional secondary transform is performed on low-frequency components in the initial transformation matrix; and a quantization module, configured to quantize the transformation result.

2. The video encoding apparatus according to claim 1, wherein the transformation module is further configured to perform another transform perpendicular to the predetermined direction on the target residual block according to another transformation matrix; the another transformation matrix is a product of another initial transformation matrix and another secondary transformation matrix, the another initial transformation matrix corresponds to a one-dimensional initial transform perpendicular to the predetermined direction in the two-dimensional initial transform, and the another secondary transformation matrix corresponds to a one-dimensional secondary transform perpendicular to the predetermined direction in the two-dimensional secondary transform.

3. The video encoding apparatus according to claim 1, wherein sizes of the two-dimensional initial transform and the two-dimensional secondary transform are the same.

4. The video encoding apparatus according to claim 1, wherein the transformation matrix is:

$$\begin{bmatrix} 34 & 77 & 79 & 55 \\ 58 & 69 & -33 & -84 \\ 72 & -7 & -75 & 73 \\ 81 & -75 & 58 & -28 \end{bmatrix}.$$

5. The video encoding apparatus according to claim 1, being applied to a digital audio video standard (AVS) encoding system.

6. The video encoding apparatus according to claim 1, wherein when the target residual block does not require the one-dimensional secondary transform performed along the predetermined direction, the transformation module sets the secondary transformation matrix as a unit matrix.

7. The video encoding apparatus according to claim 1, wherein a size of the two-dimensional initial transform perpendicular to the predetermined direction is greater than a size of the two-dimensional secondary transform perpendicular to the predetermined direction; the transformation module is further configured to:

before performing the transform, perform a one-dimensional initial transform perpendicular to the predetermined direction in the two-dimensional initial transform on an input image data block to generate an initial transformation result comprising a first sub-block and a second sub-block; wherein the first sub-block is the target residual block, and size of the first sub-block perpendicular to the predetermined direction is equal to the size of the two-dimensional secondary transform perpendicular to the predetermined direction;

perform the one-dimensional initial transform along the predetermined direction in the two-dimensional initial transform on the second sub-block; and perform a one-dimensional secondary transform perpendicular to the predetermined direction in the two-dimensional secondary transform on an intermediate transform result generated from performing the transform on the target residual block.

8. A video encoding method, comprising:

performing a transform on a target residual block along a predetermined direction according to a transformation matrix, wherein the transformation matrix is based on arranging a horizontal row secondary transform between a horizontal row initial transform and a vertical column initial transform;

wherein, the transformation matrix is a product of an initial transformation matrix and a secondary transformation matrix, the initial transformation matrix corresponds to a one-dimensional initial transform performed along the predetermined direction in a two-dimensional initial transform, and the secondary transformation matrix corresponds to a one-dimensional secondary transform performed along the predetermined direction in a two-dimensional secondary transform, wherein the one-dimensional initial transform is a discrete cosine transform performed along the predetermined direction in the two-dimensional initial transform, and the one-dimensional secondary transform is performed on low-frequency components in the initial transformation matrix.

9. The video encoding method according to claim 8, further comprising:

performing another transform perpendicular to the predetermined direction on the target residual block according to another transformation matrix;

wherein, the another transformation matrix is a product of another initial transformation matrix and another secondary transformation matrix, the another initial transformation matrix corresponds to a one-dimensional initial transform perpendicular to the predetermined direction in the two-dimensional initial transform, and the another secondary transformation matrix corresponds to a one-dimensional secondary transform perpendicular to the predetermined direction in the two-dimensional secondary transform.

10. The video encoding method according to claim 8, wherein sizes of the two-dimensional initial transform and the two-dimensional secondary transform are the same.

11. The video encoding method according to claim 10, applied to the digital AVS, wherein the transformation matrix is:

$$\begin{bmatrix} 34 & 77 & 79 & 55 \\ 58 & 69 & -33 & -84 \\ 72 & -7 & -75 & 73 \\ 81 & -75 & 58 & -28 \end{bmatrix}.$$

12. The video encoding method according to claim 8, wherein when the target residual block does not require the one-dimensional secondary transform performed along the predetermined direction, the secondary transformation matrix is set to a unit matrix.

13. The video encoding method according to claim 8, wherein a size of the two-dimensional initial transform perpendicular to the predetermined direction is greater than a size of the two-dimensional secondary transform perpendicular to the predetermined direction; the video encoding method further comprising:
- before performing the transform, performing a one-dimensional initial transform perpendicular to the predetermined direction in the two-dimensional initial transform on an input image data block to generate an initial transformation result comprising a first sub-block and a second sub-block; wherein the first sub-block is the target residual block, and size of the first sub-block perpendicular to the predetermined direction is equal to the size of the two-dimensional secondary transform perpendicular to the predetermined direction;
- performing the one-dimensional initial transform along the predetermined direction in the two-dimensional initial transform on the second sub-block; and
- performing a one-dimensional secondary transform perpendicular to the predetermined direction in the two-dimensional secondary transform on an intermediate transform result generated from performing the transform on the target residual block.

14. A video decoding method, decoding a plurality of coded data, the method comprising:
- decoding a set of target coded data to generate quantized residual block information;
- de-quantizing the quantized residual block information to generate intermediate information;
- performing a reverse transform on the intermediate information along a predetermined direction according to a reverse transformation matrix to generate a residual block, wherein the transformation matrix is based on arranging a horizontal row secondary transform between a horizontal row initial transform and a vertical column initial transform;
- wherein, the reverse transformation matrix is a product of a reverse initial transformation matrix and a reverse secondary transformation matrix, the reverse initial transformation matrix corresponds to a one-dimensional reverse initial transform performed along the predetermined direction in a two-dimensional reverse initial transform, and the reverse secondary transformation matrix corresponds to a one-dimensional reverse secondary transform performed along the predetermined direction in a two-dimensional reverse secondary transform, wherein the one-dimensional reverse initial transform is a discrete cosine transform performed along the predetermined direction in the two-dimensional initial transform, and the one-dimensional reverse secondary transform is performed on low-frequency components in the reverse initial transformation matrix;
- performing an intra-frame prediction on the residual block to generate a prediction block; and
- generating a target image block using the prediction block and the residual block.

15. The video decoding method according to claim 14, further comprising:
- performing another reverse transform along a direction perpendicular to the predetermined direction according to another reverse transformation matrix;
- wherein, the another reverse transformation matrix is a product of another reverse initial transformation matrix and another reverse secondary transformation matrix, the another reverse initial transformation matrix corresponds to a one-dimensional reverse initial transform perpendicular to the predetermined direction in the two-dimensional initial transform, and the another reverse secondary transformation matrix corresponds to a one-dimensional reverse secondary transform perpendicular to the predetermined direction in the two-dimensional reverse secondary transform.

16. The video decoding method according to claim 14, wherein sizes of the two-dimensional reverse initial transform and the two-dimensional reverse secondary transform are the same.

17. The video decoding method according to claim 16, applied to the digital AVS, wherein the predetermined direction is a horizontal direction, and the reverse transformation matrix is:

$$\begin{bmatrix} 34 & 58 & 72 & 81 \\ 77 & 69 & -7 & -75 \\ 79 & -33 & -75 & 58 \\ 55 & -84 & 73 & -28 \end{bmatrix}.$$

18. The video decoding method according to claim 14, wherein when it is determined that the one-dimensional reverse secondary transform performed along the predetermined direction is not required, the reverse secondary transformation matrix is set to a unit matrix.

19. The video decoding method according to claim 14, wherein a size of the two-dimensional reverse initial transform perpendicular to the predetermined direction is greater than a size of the two-dimensional reverse secondary transform perpendicular to the predetermined direction; the video decoding method further comprising:
- before performing the transform, performing a one-dimensional reverse initial transform perpendicular to the predetermined direction in the two-dimensional reverse initial transform on an input data to generate an initial transformation result comprising a first sub-block and a second sub-block; wherein the first sub-block is the intermediate information, and a size of the first sub-block perpendicular to the predetermined direction is the size of the two-dimensional reverse secondary transform perpendicular to the predetermined direction;
- performing a one-dimensional reverse initial transform along the predetermined direction in the two-dimensional reverse initial transform on the second sub-block; and
- performing a one-dimensional reverse secondary transform perpendicular to the predetermined direction in the two-dimensional reverse secondary transform on an intermediate transform result generated from performing the combined reverse transform on the intermediate information.

20. A video encoding apparatus, for encoding a plurality of image blocks in a video frame, the video encoding apparatus comprising:
- an intra-frame prediction module comprising a multiplexer to receive, configured to perform intra-frame prediction on the plurality of image blocks to generate a plurality of residual blocks;
- a transformation module, configured to perform a transform on a target residual block along a predetermined direction according to a transformation matrix to generate a transformation result;
- wherein, the transformation matrix is a product of an initial transformation matrix and a secondary transformation matrix, the initial transformation matrix corresponds to a one-dimensional initial transform performed along the predetermined direction in a two-dimensional initial transform, and the secondary transformation matrix corresponds to a one-dimensional secondary transform performed along the predetermined direction in a two-dimensional secondary transform; and a quantization module, configured to quantize the transformation result wherein a size of the two-dimensional initial transform perpendicular to the predetermined direction is greater than a size of the two-dimensional secondary transform perpendicular to the predetermined direction; the transformation module is further configured to:

before performing the transform, perform a one-dimensional initial transform perpendicular to the predetermined direction in the two-dimensional initial transform on an input image data block to generate an initial transformation result comprising a first sub-block and a second sub-block; wherein the first sub-block is the target residual block, and size of the first sub-block perpendicular to the predetermined direction is equal to the size of the two-dimensional secondary transform perpendicular to the predetermined direction;

perform the one-dimensional initial transform along the predetermined direction in the two-dimensional initial transform on the second sub-block; and perform a one-dimensional secondary transform perpendicular to the predetermined direction in the two-dimensional secondary transform on an intermediate transform result generated from performing the transform on the target residual block.

* * * * *